United States Patent
Sandhu et al.

(10) Patent No.: US 10,368,232 B2
(45) Date of Patent: Jul. 30, 2019

(54) METHODS FOR CONNECTION CAPABILITY EXCHANGE

(71) Applicant: QUALCOMM Incorporated, San Diego, CA (US)

(72) Inventors: Shivraj Singh Sandhu, Milpitas, CA (US); Andrew Mackinnon Davidson, Monte Serento, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/225,724

(22) Filed: Aug. 1, 2016

(65) Prior Publication Data
US 2017/0041779 A1 Feb. 9, 2017

Related U.S. Application Data

(60) Provisional application No. 62/201,495, filed on Aug. 5, 2015.

(51) Int. Cl.
| | | |
|---|---|---|
| *H04W 8/22* | (2009.01) | |
| *H04W 76/14* | (2018.01) | |
| *H04W 4/80* | (2018.01) | |
| *H04W 8/00* | (2009.01) | |
| *H04W 8/24* | (2009.01) | |

(52) U.S. Cl.
CPC ............ *H04W 8/22* (2013.01); *H04W 4/80* (2018.02); *H04W 8/005* (2013.01); *H04W 8/24* (2013.01); *H04W 76/14* (2018.02)

(58) Field of Classification Search
CPC ....... H04W 8/005; H04W 8/24; H04W 4/008; H04W 8/22; H04W 76/023; H04W 8/00;
(Continued)

(56) References Cited

U.S. PATENT DOCUMENTS

| | | | |
|---|---|---|---|
| 9,538,561 B2 * | 1/2017 | Qi ........................ | H04W 76/11 |
| 2005/0193106 A1 * | 9/2005 | Desai ................... | H04W 84/18 |
| | | | 709/223 |
| 2011/0082940 A1 | 4/2011 | Montemurro et al. | |
| 2011/0191456 A1 * | 8/2011 | Jain ....................... | H04L 67/16 |
| | | | 709/223 |
| 2012/0076117 A1 * | 3/2012 | Montemurro ......... | H04W 48/16 |
| | | | 370/338 |
| 2013/0288668 A1 * | 10/2013 | Pragada ................ | H04W 12/06 |
| | | | 455/426.1 |

(Continued)

FOREIGN PATENT DOCUMENTS

| | | |
|---|---|---|
| WO | WO-2007057758 A2 | 5/2007 |
| WO | WO-2010122369 A1 | 10/2010 |
| WO | WO-2012040567 A1 | 3/2012 |

OTHER PUBLICATIONS

International Search Report and Written Opinion—PCT/US2016/045195—ISA/EPO—dated Oct. 14, 2016.

*Primary Examiner* — Meless N Zewdu
(74) *Attorney, Agent, or Firm* — Paradice and Li LLP/Qualcomm

(57) ABSTRACT

Methods and apparatuses are disclosed for communicating in a wireless communication network. One method of communicating over a wireless communication network includes transmitting, by a first wireless device, a connection capability request message to a second wireless device requesting connection capability information of the second wireless device. The method further includes receiving, by the first wireless device, a connection capability response from the second wireless device indicating one or more communication protocols available for providing a service to the first wireless device. In some aspects, the method may further include selecting, by the first wireless device, based at least in part on the connection capability response, a communication protocol from one of the one or more
(Continued)

communication protocols indicated, wherein the communication protocol may be utilized for obtaining the service from the second wireless device.

24 Claims, 8 Drawing Sheets

(58) Field of Classification Search
CPC ... H04W 76/02; H04W 84/025; H04W 88/02; H04W 88/023; H04W 4/08; H04W 76/00; H04W 76/043; H04W 4/00; H04W 4/14; H04W 8/18; H04W 28/0215; H04W 88/18; H04W 40/24; H04W 40/246; H04W 88/00; H04W 92/18; H04W 92/10; H04W 76/14; H04W 4/80; H04W 4/50; H04W 88/08; H04W 28/24; H04W 28/16; H04W 4/60; H04W 4/70; H04W 28/0273; H04W 80/00; H04W 80/02; H04W 80/04; H04W 80/045; G06F 9/468; G06F 11/142; G06F 11/1423; G06F 11/1425; G06F 17/30206; G06F 17/30209

See application file for complete search history.

(56) References Cited

U.S. PATENT DOCUMENTS

| | | | |
|---|---|---|---|
| 2014/0045422 A1* | 2/2014 | Qi | H04W 76/023 455/39 |
| 2014/0095630 A1* | 4/2014 | Wohlert | H04W 4/028 709/206 |
| 2015/0172905 A1* | 6/2015 | Qi et al. | H04W 8/005 |
| 2015/0245393 A1* | 8/2015 | Lee | H04W 8/005 370/338 |
| 2016/0134710 A1* | 5/2016 | Ryu | H04L 67/16 370/338 |
| 2016/0234301 A1* | 8/2016 | Qi et al. | H04L 67/1068 |
| 2016/0366718 A1* | 12/2016 | Sadeghi | H04W 76/023 |
| 2017/0048788 A1* | 2/2017 | Chen | H04L 29/08 |
| 2018/0054492 A1* | 2/2018 | Kim et al. | H04L 67/16 |

* cited by examiner

METHODS FOR CONNECTION CAPABILITY EXCHANGE

CROSS REFERENCE TO RELATED APPLICATIONS

This application claims priority to U.S. Provisional Application No. 62/201,495 filed Aug. 5, 2015, and entitled "METHODS FOR CONNECTION CAPABILITY EXCHANGE." The contents of this prior application is considered part of this application, and is hereby incorporated by reference in its entirety.

FIELD

Certain aspects of the present disclosure generally relate to wireless communications, and more particularly, to methods and apparatuses for a connection capability exchange.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may communicate using various protocols. Each of the varying protocols may have their own benefits, which can be based at least in part on the information being exchanged. Further, the devices within the wireless network may utilize varying protocols in the process of discovering or connecting to the devices within the wireless network. As such, systems, methods, and non-transitory computer-readable media are needed for optimizing discovery and connection processes in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method of communicating in a wireless communication network. The method includes transmitting, by a first wireless device, a connection capability request message to a second wireless device requesting connection capability information of the second wireless device. The method further includes receiving, by the first wireless device, a connection capability response message from the second wireless device indicating one or more communication protocols available for providing a service to the first wireless device. In some aspects, the method further includes selecting, by the first wireless device, based at least in part on the connection capability response message, a communication protocol for obtaining the service from the second wireless device.

Another aspect provides an apparatus configured to communicate in a wireless communication network. The apparatus includes a transmitter configured to transmit a connection capability request message to a second wireless device requesting connection capability information of the second wireless device. The apparatus further includes a receiver configured to receive a connection capability response message from the second wireless device indicating one or more communication protocols available for providing a service to the first wireless device. In some aspects, the apparatus further includes a processor configured to select, based at least in part on the connection capability response message, a communication protocol for obtaining the service from the second wireless device.

Another aspect provides another apparatus for communicating in a wireless communication network. The apparatus includes means for transmitting a connection capability request message to a second wireless device requesting connection capability information of the second wireless device. The apparatus further includes means for receiving a connection capability response message from the second wireless device indicating one or more communication protocols available for providing a service to the first wireless device. In some aspects, the apparatus further includes means for selecting, based at least in part on the connection capability response message, a communication protocol for obtaining the service from the second wireless device.

Another aspect provides a non-transitory computer readable medium. The medium includes code that, when executed, performs a method of communicating in a wireless communication network. The method includes transmitting, by a first wireless device, a connection capability request message to a second wireless device requesting connection capability information of the second wireless device. The method further includes receiving, by the first wireless device, a connection capability response message from the second wireless device indicating one or more communication protocols available for providing a service to the first wireless device. In some aspects, the method further includes selecting, by the first wireless device, based at least in part on the connection capability response message, a communication protocol for obtaining the service from the second wireless device.

DETAILED DESCRIPTION

Figure 1:
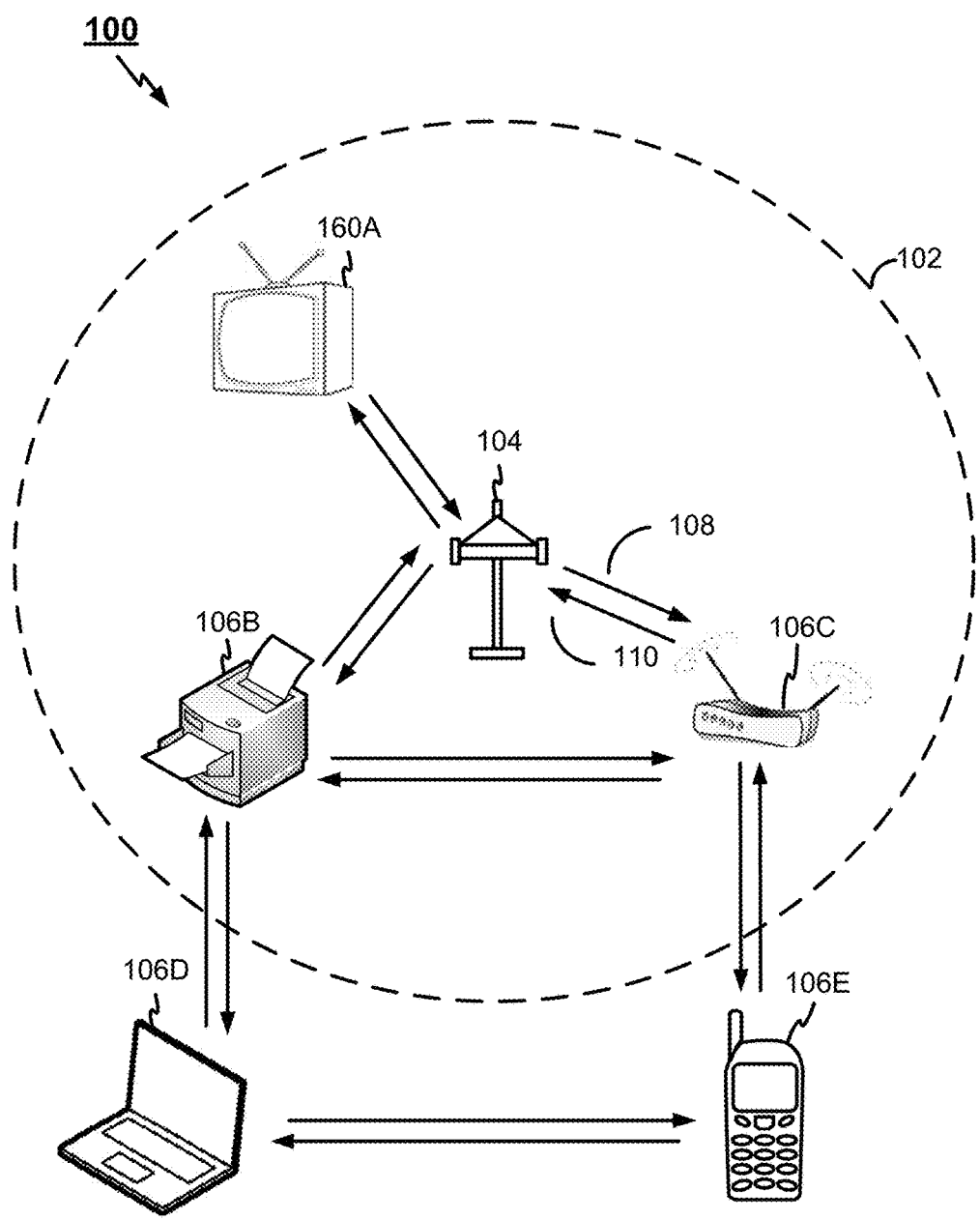
FIG. 1 illustrates an example of a wireless communication system in which aspects of the present disclosure can be employed.

Various aspects of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A wireless local area network (WLAN) can be used to interconnect nearby devices together, employing widely used networking protocols. The various aspects described herein can apply to any communication standard, such as Wi-Fi or, more generally, any member of the IEEE 802.11 family of wireless protocols. Further, the various aspects described herein can additionally or alternatively apply to Bluetooth communication protocols, and more generally, any member of the IEEE 802.15 family of wireless protocols. Further, the various aspects described herein can additionally or alternatively apply to near field communication (NFC) protocols, such as the ISO/IEC 14443 or ISO/IEC 18000-3 protocols.

In some aspects, wireless signals can be transmitted according to a high-efficiency 802.11 protocol using orthogonal frequency division multiplexing (OFDM), direct-sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations (STAs), singular station (STA). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement a Global Systems for Mobile (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement Institute of Electrical and Electronics Engineers (IEEE) 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example any one of the 802.11 family of standards. The wireless communication system 100 can include an AP 104, which communicates with STAs. For example, as illustrated, AP 104 can communicate with STAs 106A, 106B, and 106C, but may not be in communication with STAs 106D or 106E (all of which may be referred to herein collectively as "STAs 106" or individually as a "STA 106"). In some aspects, STAs 106A, 106B, and 106C may be "associated" with the AP 104, while the STAs 106D and 106E may not.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer (P2P) network between or among the STAs 106. Accordingly, at least some of the functions of the AP 104 described herein can alternatively be performed by one or more of the STAs 106. For example, STA 106D may connect to STA 106B via a P2P network connection.

Figure 2:
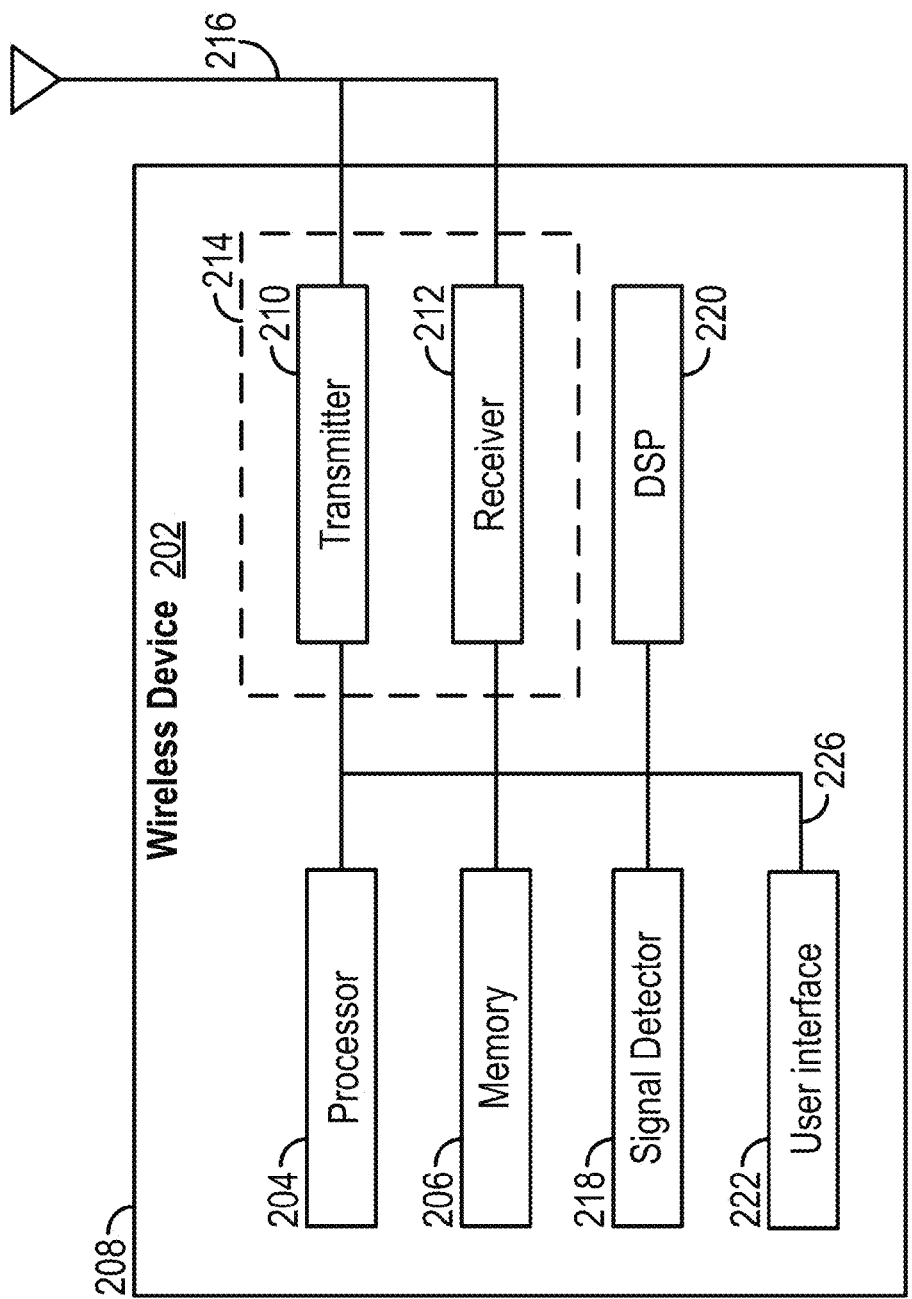
FIG. 2 illustrates various components that can be utilized in a wireless device that can be employed within the wireless communication system of FIG. 1, according to an embodiment.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include an electronic hardware processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate arrays (FPGA), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during Multiple Input and Multiple Output (MIMO) communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a PLCP protocol data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to transmit one or more data messages to STAs 106 in optimized ways to improve efficiency. In some embodiments, STAs 106 can access the wireless medium in a more efficient manner, such as by requesting and receiving connection capability exchange messages. Based on the connection capability exchange messages, the STAs 106 may select an optimal connection protocol for receiving a service, thereby improving user experience.

Figure 3:
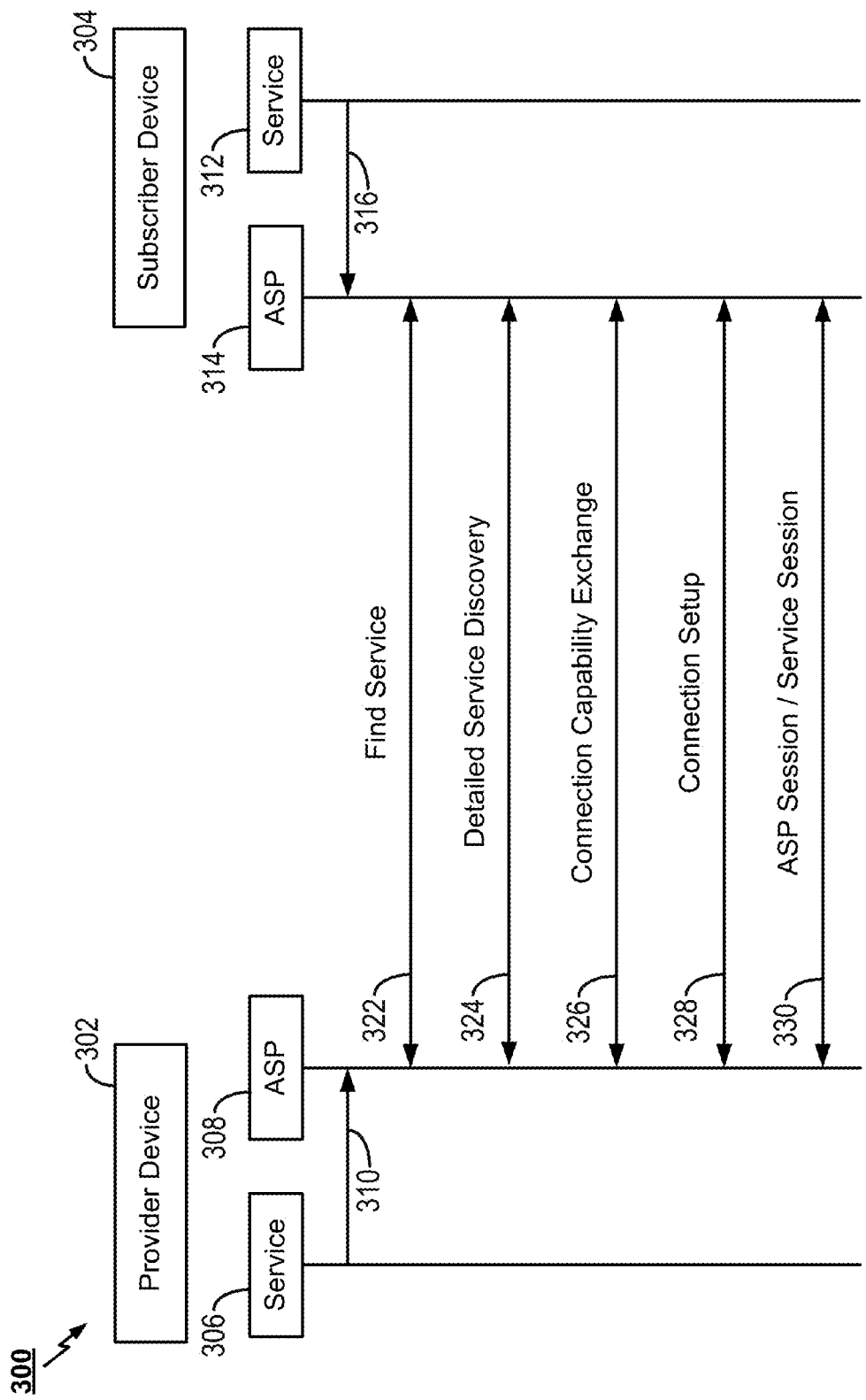
FIG. 3 illustrates a call flow diagram for an exemplary message exchange between a provider device and a subscriber device, according to an embodiment.

FIG. 3 illustrates a call flow diagram for an exemplary message exchange 300 between a provider device 302 and a subscriber device 304, according to an embodiment. The provider device 302 or the subscriber device 304 may be any one of the STAs 106A-E or the AP 104 of FIG. 1. The provider device 302 may also be referred to as a publisher device or an advertiser device, as it may publish or advertise information about a service 306 it can provide to the subscriber device 304. The subscriber device 304 may also be referred to as a seeker device, as it can be the device seeking a service 312 from the provider device 302. In some aspects, the service 306 may be broader in scope than the service 312. For example, the service 306 provided by the provider device 302 may comprise a range of available services (e.g., a range of printing capabilities of a printer), and the service 312 may comprise a service that the subscriber device 304 is seeking to obtain at the time of the message exchange 300 (e.g., a specific document that the subscriber device 304 is attempting to print and associated printing parameters). Message exchange 300 may occur within a wireless communications environment, such as the wireless communication system 100 of FIG. 1, or some other wireless communications environment.

In various embodiments, the provider device 302 is configured to provide a service 306 to other devices. For example, service 306 can comprise printing paper, providing a connection for a peripheral to a computer, or playing music. In some aspects, the provider device 302 may utilize an application service platform (ASP) 308 to provide the service 306 to one or more devices, such as the subscriber device 304. In accordance with these aspects, the provider device 302 may provide information 310 about the service 306 through the ASP 308. The level of detail provided about the service 306 may vary, which may be based at least in part upon a communication protocol utilized as part of the message exchange 300.

In some aspects, the subscriber device 304 may be configured to seek a service 312 from another device through the use of an ASP 314. In accordance with these aspects, the subscriber device 304 may provide information 316 about the service 312 to the ASP 314. For example, the subscriber device 304 may provide information 316 indicating that the subscriber device 304 is seeking another device that is capable of printing in color, connecting a wireless mouse, or playing an MP4 file. The level of detail provided about the service 312 sought may vary, which may be based at least in part upon a communication protocol utilized as part of the message exchange 300.

ASP 308 may reside within the provider device 302 as computer program code. Similarly, ASP 314 may reside within the subscriber device 304 as computer program code. For example, ASP 308 or 314 may reside within the memory 206 of the wireless device 202 of FIG. 2, and may be executed by the processor 204. In various aspects, ASP 308 or 314 may utilize multiple service discovery mechanisms to set up a connection topology between the provider device 302 and the subscriber device 304 for the services 306, 312 to run service protocols over the connection. For example, ASP 308 or 314 may utilize one or more communication or discovery mechanisms, such as via a P2P, a Neighbor Awareness Networking ("NAN"), a Bluetooth low energy ("BT LE"), an NFC, or an "Infrastructure" communication. P2P connection may refer to a Wi-Fi communication link between devices that are not associated with a network (e.g., not associated with the AP 104). In some aspects, an Infrastructure mechanism may refer to a connection from one STA 106 to another via an associated AP 104. In some aspects, the ASP 308 or 314 may be the Wi-Fi Alliance (WFA) ASP version 2.0.

As illustrated, the message exchange 300 involves a service discovery phase 322 (illustrated as "Find Service"). As a part of the service discovery phase 322, the subscriber device 304 may seek to identify a provider for the service 312. In some aspects, a message that seeks to identify a provider for the service 312 may be considered a discovery message. The discovery message may be transmitted over the network in some aspects. For example, the subscriber device 304 may initiate or otherwise perform a service discovery protocol by transmitting information about the service 312. This information may be transmitted via P2P, NAN, BT LE, NFC, or Infrastructure mechanisms. In various embodiments, the transmission may be broadcast or multicast. The level of information 316 provided about the service 312 can vary depending on the discovery mechanism utilized. After the information 316 about the service 312 is transmitted, the provider device 302 may receive and process the transmitted information. Based on receiving and processing the information 316, the provider device 302 may transmit information 310 about the service 306. In some aspects, the information 310 transmitted, or a decision as to whether to transmit the information 310, may be based at least in part upon a comparison of the information 316 provided about the service 312 being sought by the subscriber device 304 to information 310 about the service 306 available for the provider device 302. In one embodiment, the transmitted information may comprise a service advertisement. In some aspects, the order of the steps above may be reversed, or the provider device 302 may otherwise advertise information 310 about the service 306 before the subscriber device 304 requests the information 310. Similar to above, the level of information provided about the service 306 can vary depending on the discovery mechanism utilized. In some aspects, the information 310 may be included in a discovery response message.

After this information 310 is transmitted, it may be received and processed by the subscriber device 304. Based on this information, the subscriber device 304 may decide whether to proceed with obtaining the service 306 from the provider device 302, or whether to obtain additional information 310 about the service 306. In some aspects, these determinations may be based at least in part upon a comparison of the information 310 obtained about the service 306 being provided by the provider device 302 and the service 312 being sought by the subscriber device 304.

As illustrated, after the service discovery phase 322, the message exchange 300 proceeds to a detailed service discovery phase 324. As a part of the detailed service discovery phase 324, the subscriber device 304 may obtain additional information 310 about the service 306 provided by the provider device 302. For example, the subscriber device 304 may have only determined that the service 306 provide by the provider device 302 is capable of printing, but may benefit from having additional information about the service 306. In one embodiment, this information 310 may comprise indications of whether the service 306 is capable of printing in color, what image resolutions or quality levels are available, the sizes of available paper, etc. The subscriber device 304 and the provider device 302 may exchange messages as part of the detailed service discovery phase 324 accordingly, which may depend upon the service 306 or 312 or the communication protocol utilized. Thereafter, the subscriber device 304 may make a determination of whether to proceed with obtaining the service 306. In various aspects, this determination may be based, at least in part, upon whether the detailed information 310 obtained about the service 306 indicates that the service 306 is sufficient to provide the service 312 that the subscriber device 304 is seeking.

As illustrated, after the detailed service discovery phase 324, the message exchange 300 proceeds to a connection capability exchange phase 326. As part of the connection capability exchange phase 326, the subscriber device 304 may transmit a request for information about the various connection protocols available from the provider device 302 for providing the service 306. Upon receiving this request, the provider device 302 may generate a response containing indications of the connection protocols available for providing the service 306 to the subscriber device 304. This response may be generated and transmitted to the subscriber device 304, which may process the response to determine which of the available protocols to use. This determination may be based at least in part upon the available connection protocols and the service 312 that the subscriber device is seeking to obtain. For example, the subscriber device 304 may determine that the provider device 302 is capable of providing the service 306 through a P2P or NAN connection protocol. The subscriber device 304 may then make a determination as to whether the P2P or the NAN connection is better for receiving the service 312 (e.g., one may be faster for providing the requested service 312).

The connection protocols available may provide communication or connection within internet protocol (IP) as well as non-IP networks. For example, the connection protocol may comprise P2P groups that supports either IP or non-IP P2P networks. In some aspects, one of the available connection protocols for providing or receiving the service 306 or 312 may comprise an existing Wi-Fi infrastructure. As a non-limiting example of a benefit of utilizing the connection capability exchange phase 326, provider device 302 and subscriber device 304 may conclusively transition from running service discovery protocols to setting up a connection between the devices. As another non-limiting example of a benefit of utilizing the connection capability exchange phase 326, the subscriber device 304 may select an optimal connection protocol for obtaining the service 306, 312 from the provider device 302.

As illustrated, after the connection capability exchange phase 326, the message exchange 300 proceeds to a connection setup phase 328. As part of the connection setup phase 328, the provider device 302 and the subscriber device 304 may utilize a selected connection protocol to initiate the process of providing or receiving the service 306 or 312. The connection setup phase 328 may comprise authentication, security, association, or other mechanisms that may be utilized to initiate providing or receiving the service 306 or 312.

As illustrated, after the connection setup phase 328, the message exchange 300 proceeds to a service session phase 330 (illustrated as "ASP Session/Service Session"). As part of the service session phase 330, the subscriber device 304 may receive the service 306 provided by the provider device 302. For example, the service session phase 330 may comprise the exchange of service specific protocol and data information. This information may include, for example, Internet Protocol Addresses, destination service access points, protocol information (e.g. TCP or UDP). In some aspects, as part of the service session phase 330 the ASP 308 or 314 may establish and manage a session between the services 306 and 312.

Although message exchange 300 is illustrated as occurring between one provider device 302 and one subscriber device 304, more provider devices 302 or subscriber devices 304 may be utilized. For example, in some aspects, the provider device 302 may provide the service 306 to more than one subscriber device 304. Additionally or alternatively, the subscriber device 304 may obtain, or otherwise attempt to obtain, the service 312 from more than one provider device 302.

In an exemplary embodiment, the subscriber device 304 may be the STA 106D of FIG. 1 (illustrated as a laptop), and the provider device 302 may be the STA 106B (illustrated as a printer). In accordance with this embodiment, the STA 106D may conduct the service discovery phase 322 to discover the presence of a device that is capable of printing, such as the STA 106B. During the service discovery phase 322, the STA 106D may discover other devices capable of printing. Next, during the detailed service discovery phase 324, the STA 106D may obtain additional information about the printing provided by the STA 106B, or any other devices discovered during the service discovery phase 322. The information obtained during the detailed service discovery phase 324 may be used to determine whether the STA 106B, or any of the other discovered devices, are capable of printing the specific task which the STA 106D is attempting to print (e.g., a 235 page color .pdf document, stapled, on standard 8.5"×11" paper). If no devices are capable of printing the task, then the message exchange 300 may end. If a device is capable of printing the task (i.e., providing the requested service), then the STA 106D may obtain additional information about the various connection protocols available for obtaining the service from the STA 106B or the other discovered devices. In various embodiments, this information can be obtained through the connection capability exchange phase 326. Once the STA 106D has information about all of the available connection protocols, the STA 106D may make a determination as to which connection protocol to utilize to print the task. In some aspects, this determination can be based on which of the available protocols provides that fastest connection between the STA 106D and the STA 106B, which may be based on the fact that the STA 106D is attempting to print a large file. Once the STA 106D makes a selection of the connection protocol it will use, the STAs 106D and 106B may connect through the connection setup phase 328. Thereafter, the STA 106B may print the task for the STA 106D during the service session phase 330.

Figure 4:
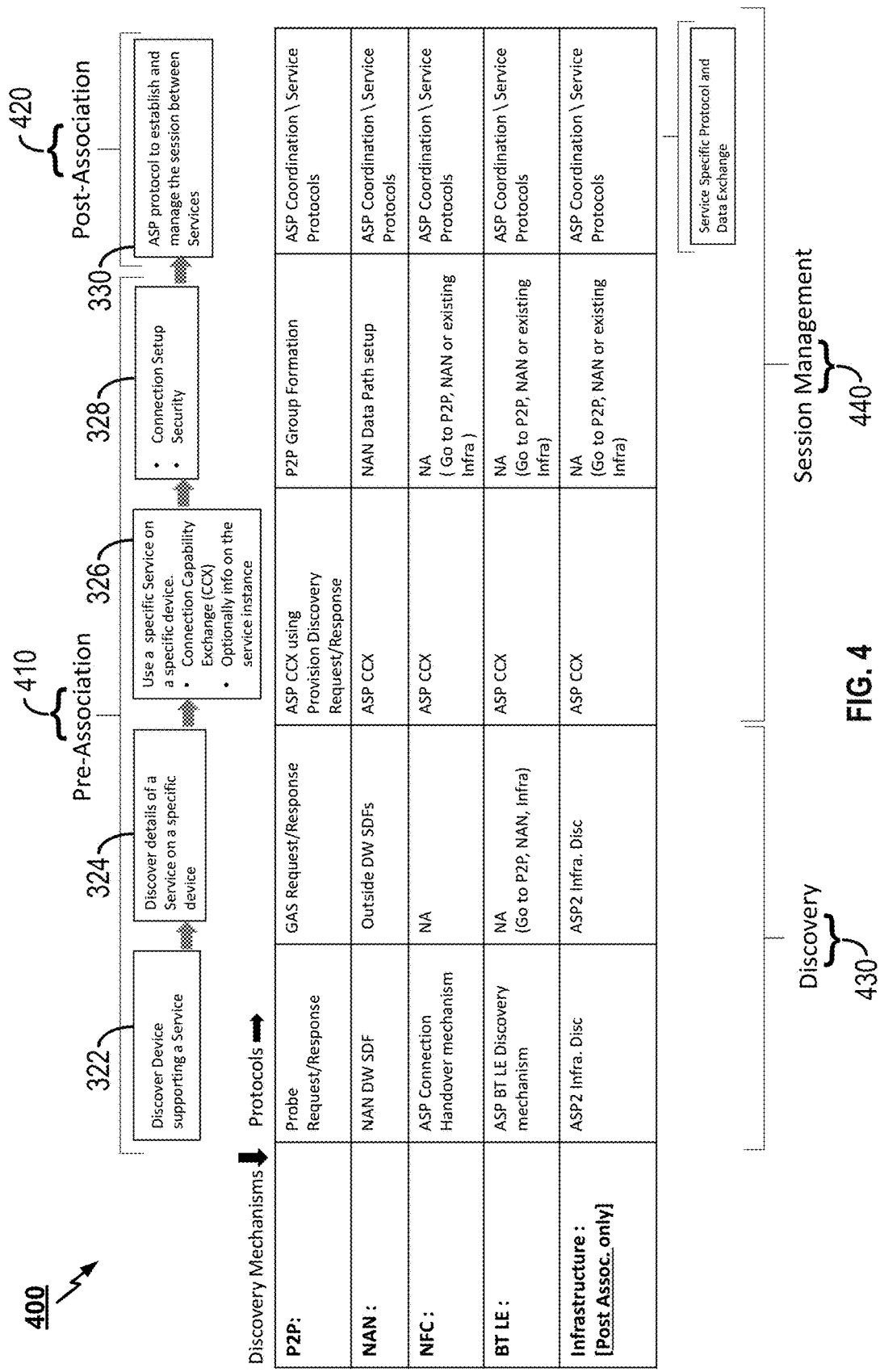
FIG. 4 illustrates a table of discovery mechanisms and protocols that may be utilized in the exemplary message exchange of FIG. 3, according to an embodiment.

FIG. 4 illustrates a table 400 of discovery mechanisms and protocols that may be utilized in the exemplary message exchange 300 of FIG. 3, according to an embodiment. As illustrated, the service discovery phase 322, the detailed service discovery phase 324, the connection capability exchange phase 326, and the connection setup phase 328 may be regarded as pre-association phases 410. During, or as a result of, the connection setup phase 328, association may occur, for example, between the provider device 302 and the subscriber device 304, or between one or both of the provider device 302 and an AP 104, or the subscriber device 304 and the AP 104. Therefore, the service session phase 330 is illustrated as a post-association phase 420.

Also as illustrated, the discovery phase 430 of the exemplary message exchange 300 may comprise the service discovery phase 322 and the detailed service discovery phase 324. Similarly, the session management phase 440 of the exemplary message exchange 300 may comprise the connection capability exchange phase 326, the connection setup phase 328, and the service session phase 330.

As illustrated, P2P, NAN, NFC, BT LE, or infrastructure discovery mechanisms may be utilized. Also as illustrated, each mechanism may utilize different protocols at different stages of the message exchange. For example, in some embodiments, P2P discovery mechanisms may be utilized. In accordance with these embodiments, when the P2P discovery mechanism is utilized, during the service discovery phase 322, the provider device 302 and the subscriber device 304 may utilize a probe request and response protocol. In one embodiment, if the P2P discovery mechanism is utilized, during the detailed service discovery phase 324, the provider device 302 and the subscriber device 304 may utilize a generic advertisement service ("GAS") request and response protocol. As illustrated, if the P2P discovery mechanism is utilized, during the connection capability exchange phase 326, the provider device 302 and the subscriber device 304 may utilize ASP connection capability exchange ("CCX") request and response protocols, as described herein. Also as illustrated, if the P2P discovery mechanism is utilized, during the connection setup phase 328, the provider device 302 and the subscriber device 304 may utilize P2P group formation protocols. Further, if the P2P discovery mechanism is utilized, during the service session phase 330, the provider device 302 and the subscriber device 304 may utilize ASP coordination and service protocols.

In some embodiments, NAN discovery mechanisms may be utilized. In accordance with these embodiments, during the service discovery phase 322, the provider device 302 and the subscriber device 304 may utilize a NAN discovery window service discovery frame ("DW SDF") protocol. In one embodiment, if the NAN discovery mechanism is utilized, during the detailed service discovery phase 324, the provider device 302 and the subscriber device 304 may utilize outside DW SDF protocols. As illustrated, if the NAN discovery mechanism is utilized, during the connection capability exchange phase 326, the provider device 302 and the subscriber device 304 may utilize ASP CCX request and response protocols, as described herein. Also as illustrated, if the NAN discovery mechanism is utilized, during the connection setup phase 328, the provider device 302 and the subscriber device 304 may utilize NAN data path ("NDP") setup protocols. Further, if the NAN discovery mechanism is utilized, during the service session phase 330, the provider device 302 and the subscriber device 304 may utilize ASP coordination and service protocols.

In some embodiments, NFC discovery mechanisms may be utilized. In accordance with these embodiments, when the NFC discovery mechanism is utilized, during the service discovery phase 322, the provider device 302 and the subscriber device 304 may utilize an ASP connection handover mechanism. In one embodiment, if the NFC discovery mechanism is utilized, the provider device 302 and the subscriber device 304 may not conduct the detailed service discovery phase 324. In another embodiment, the detailed service discovery phase 324 for the NFC discovery mechanism may comprise utilizing one or more of the detailed discovery mechanisms utilized for the P2P, NAN, or infrastructure discovery mechanisms. As illustrated, if the NFC discovery mechanism is utilized, during the connection capability exchange phase 326, the provider device 302 and the subscriber device 304 may utilize ASP CCX request and response protocols, as described herein. Also as illustrated, if the NFC discovery mechanism is utilized, during the connection setup phase 328, the provider device 302 and the subscriber device 304 may utilize one or more of the P2P, NAN, or infrastructure connection methods. Further, if the NFC discovery mechanism is utilized, during the service session phase 330, the provider device 302 and the subscriber device 304 may utilize ASP coordination and service protocols.

In some embodiments, BT LE discovery mechanisms may be utilized. In accordance with these embodiments, when the BT LE discovery mechanism is utilized, during the service discovery phase 322, the provider device 302 and the subscriber device 304 may utilize an ASP BT LE discovery mechanism. In one embodiment, if the BT LE discovery mechanism is utilized, the provider device 302 and the subscriber device 304 may not conduct the detailed service discovery phase 324. In another embodiment, the detailed service discovery phase 324 for the BT LE discovery mechanism may comprise utilizing one or more of the detailed discovery mechanisms utilized for the P2P, NAN, or infrastructure discovery mechanisms. As illustrated, if the BT LE discovery mechanism is utilized, during the connection capability exchange phase 326, the provider device 302 and the subscriber device 304 may utilize ASP CCX request and response protocols, as described herein. Also as illustrated, if the BT LE discovery mechanism is utilized, during the connection setup phase 328, the provider device 302 and the subscriber device 304 may utilize one or more of the P2P, NAN, or infrastructure connection methods. Further, if the BT LE discovery mechanism is utilized, during the service session phase 330, the provider device 302 and the subscriber device 304 may utilize ASP coordination and service protocols.

In some embodiments, existing infrastructure discovery mechanisms may be utilized. In accordance with these embodiments, when the infrastructure discovery mechanism is utilized, during the service discovery phase 322, the provider device 302 and the subscriber device 304 may utilize an ASP version 2 infrastructure discovery mechanism. In one embodiment, if the infrastructure discovery mechanism is utilized, the provider device 302 and the subscriber device 304 may also conduct the detailed service discovery phase 324 by utilizing the ASP version 2 infrastructure discovery mechanisms. As illustrated, if the infrastructure discovery mechanism is utilized, during the connection capability exchange phase 326, the provider device 302 and the subscriber device 304 may utilize ASP CCX request and response protocols, as described herein. Also as illustrated, if the infrastructure discovery mechanism is utilized, during the connection setup phase 328, the provider device 302 and the subscriber device 304 may utilize one or more of the P2P, NAN, or infrastructure connection methods. Further, if the infrastructure discovery mechanism is utilized, during the service session phase 330, the provider device 302 and the subscriber device 304 may utilize ASP coordination and service protocols. In various embodiments, the illustrated protocols in the table 400 may additionally or alternatively comprise other protocols.

Figure 5:
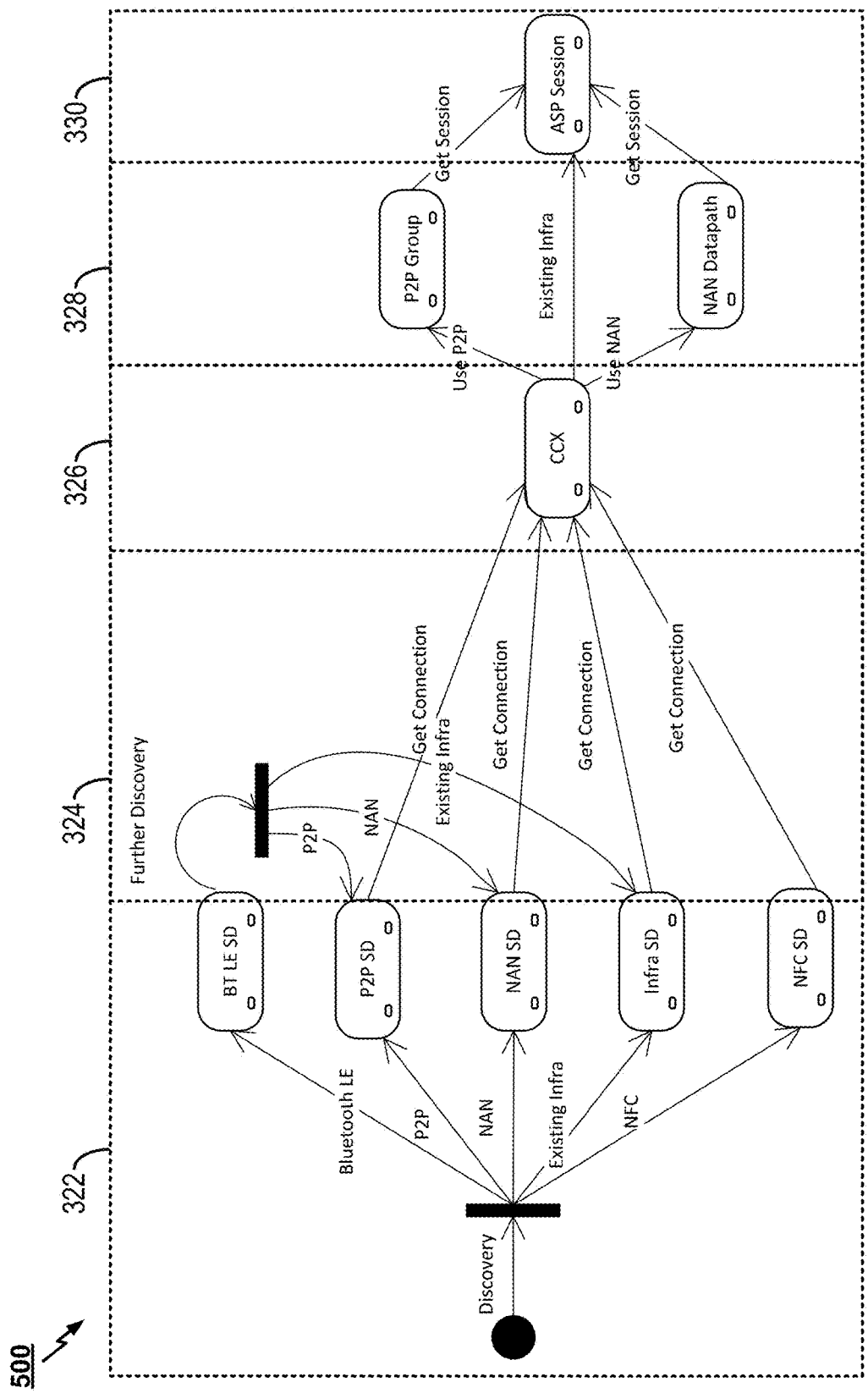
FIG. 5 illustrates an exemplary flow chart representation of the exemplary message exchange of FIG. 3, according to an embodiment.

FIG. 5 illustrates an exemplary flow chart 500 representation of the exemplary message exchange of FIG. 3, according to an embodiment. In various aspects, the flow chart 500 may correspond to a tree of methods that may be performed by a device seeking to obtain a service, such as the subscriber device 304 of FIG. 3. As illustrated, the subscriber device 304 may start within the service discovery phase 322 which may discover a provider device 302 (e.g., through an ASP), through a first discovery protocol, such as BT LE, P2P, NAN, existing infrastructure, or NFC discovery protocols. As part of the service discovery phase 322 or as part of the detailed service discovery phase 324, the subscriber device 304 may obtain additional information about the service through a second discovery protocol, such as the P2P, NAN, or existing infrastructure discovery protocols. For example, as illustrated, in the detailed service discovery phase 324, if the subscriber device 304 first utilized BT LE in the service discovery phase 322, it can thereafter utilize one or more of the P2P, NAN, or existing infrastructure discovery protocols to obtain more information about the service. In some aspects, this switch from BT LE to another protocol is because a limited amount of information may be provided via the BT LE protocol. For example, if the subscriber device 304 first seeks to obtain a provider of a service comprising playing audio utilizing BT LE, a provider device 302 may only be capable of responding with an indication that it is a headset that supports audio. However, the subscriber device 304 may benefit from having more information about the service provided, and therefore may utilize another protocol to obtain this information.

As illustrated, once the subscriber device 304 has selected a provider device 302 to provide the service, the connection capability exchange phase 326 occurs, and the subscriber device 304 may select from one of the available protocols. As illustrated, after making a selection in the connection capability exchange phase 326, the subscriber device 304 moves to the connection setup phase 328 if P2P or NAN is selected. Once the connection setup phase 328 is completed, the subscriber device 304 proceeds to the service session phase 330. If the existing infrastructure protocol is selected in the connection capability exchange phase 326, the subscriber device 304 may bypass the connection setup phase 328, and move straight to the service session phase 330, as a connection may already exist between the devices.

Figure 6:
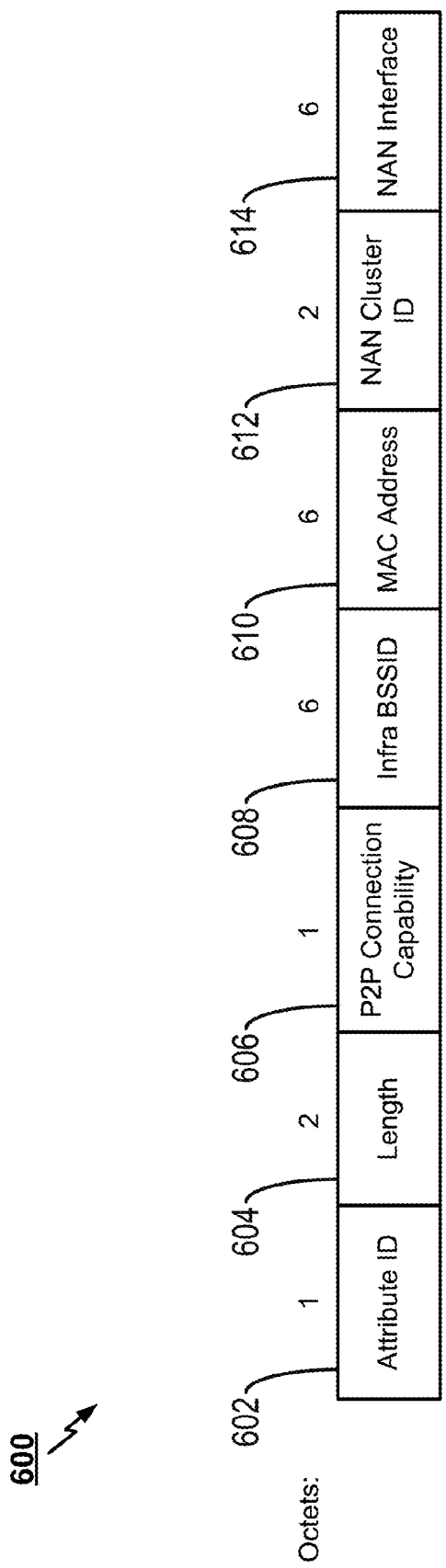
FIG. 6 illustrates an exemplary structure of a connection capability exchange message, according to an embodiment.

FIG. 6 illustrates an exemplary structure of a connection capability exchange message 600, according to an embodiment. As illustrated, the connection capability exchange message 600 comprises a one octet attribute ID field 602, a two octet length field 604, a one octet P2P connection capability field 606, a six octet infrastructure basic service set identifier (BSSID) field 608, a six octet media access control (MAC) address field 610, a two octet NAN cluster ID field 612, and a six octet NAN interface field 614. In various aspects, the number of octets or bits that each of the illustrated fields contain may be lower or higher. In various aspects, the connection capability exchange message 600 may be transmitted alone, or may be transmitted as part of another message. In some aspects, the connection capability exchange message 600 may contain more or less fields. For example, if the device transmitting the connection capability exchange message 600 does not support one or more of the possible protocols, the connection capability exchange message 600 may be shorter in length, and an indication that the protocol is not supported may otherwise be provided.

In accordance with an embodiment, the attribute ID field 602 can comprise information that identifies the connection capability exchange message 600. For example, the attribute ID field 602 may contain an indication of the value "23" in accordance with one embodiment, so that any device interpreting the connection capability exchange message 600 will be able to determine that the message is a connection capability exchange message.

In accordance with an embodiment, the length field 604 can comprise an indication of the length of the connection capability exchange message 600, or an indication of the length of the remaining fields in the connection capability exchange message 600. In accordance with an embodiment, the P2P connection capability field 606 can comprise an indication of whether the device transmitting the connection capability exchange message 600 supports P2P connectivity.

In accordance with an embodiment, the infrastructure BSSID field 608 can comprise an indication of the BSSID of associated AP 104 of the device transmitting the connection capability exchange message 600. Placing a value within the infrastructure BSSID field 608 may indicate that the device transmitting the connection capability exchange message 600 supports the existing infrastructure protocol through the use of the BSSID of the AP 104, as described herein. In some aspects, if the infrastructure BSSID field 608 is null, this may indicate that the device transmitting the connection capability exchange message 600 does not support the existing infrastructure protocol through the use of the BSSID of the AP 104.

In accordance with an embodiment, the MAC address field 610 can comprise a MAC address of the device transmitting the connection capability exchange message 600. Placing a value within the MAC address field 610 may indicate that the device transmitting the connection capability exchange message 600 supports the existing infrastructure protocol through the use of its MAC address, as described herein. In some aspects, if the MAC address field 610 is null, this may indicate that the device transmitting the connection capability exchange message 600 does not support the existing infrastructure protocol through the use of its MAC address.

In accordance with an embodiment, the NAN cluster ID field 612 can comprise an indication of the NAN cluster ID that the device transmitting the connection capability exchange message 600 is associated with. Placing a value within the NAN cluster ID field 612 may indicate that the device transmitting the connection capability exchange message 600 supports the NAN protocol through the use of the NAN cluster ID, as described herein. In some aspects, if the NAN cluster ID field 612 is null, this may indicate that the device does not support the NAN protocol through the use of a NAN cluster ID.

In accordance with an embodiment, the NAN interface field 614 can comprise a NAN MAC address of the device transmitting the connection capability exchange message 600. Placing a value within the NAN interface field 614 may indicate that the device transmitting the connection capability exchange message 600 supports the NAN protocol through the use of its NAN MAC address, as described herein. In some aspects, if the NAN interface field 614 is null, this may indicate that the device transmitting the connection capability exchange message 600 does not support the NAN protocol through the use of its NAN MAC address.

Figure 7:
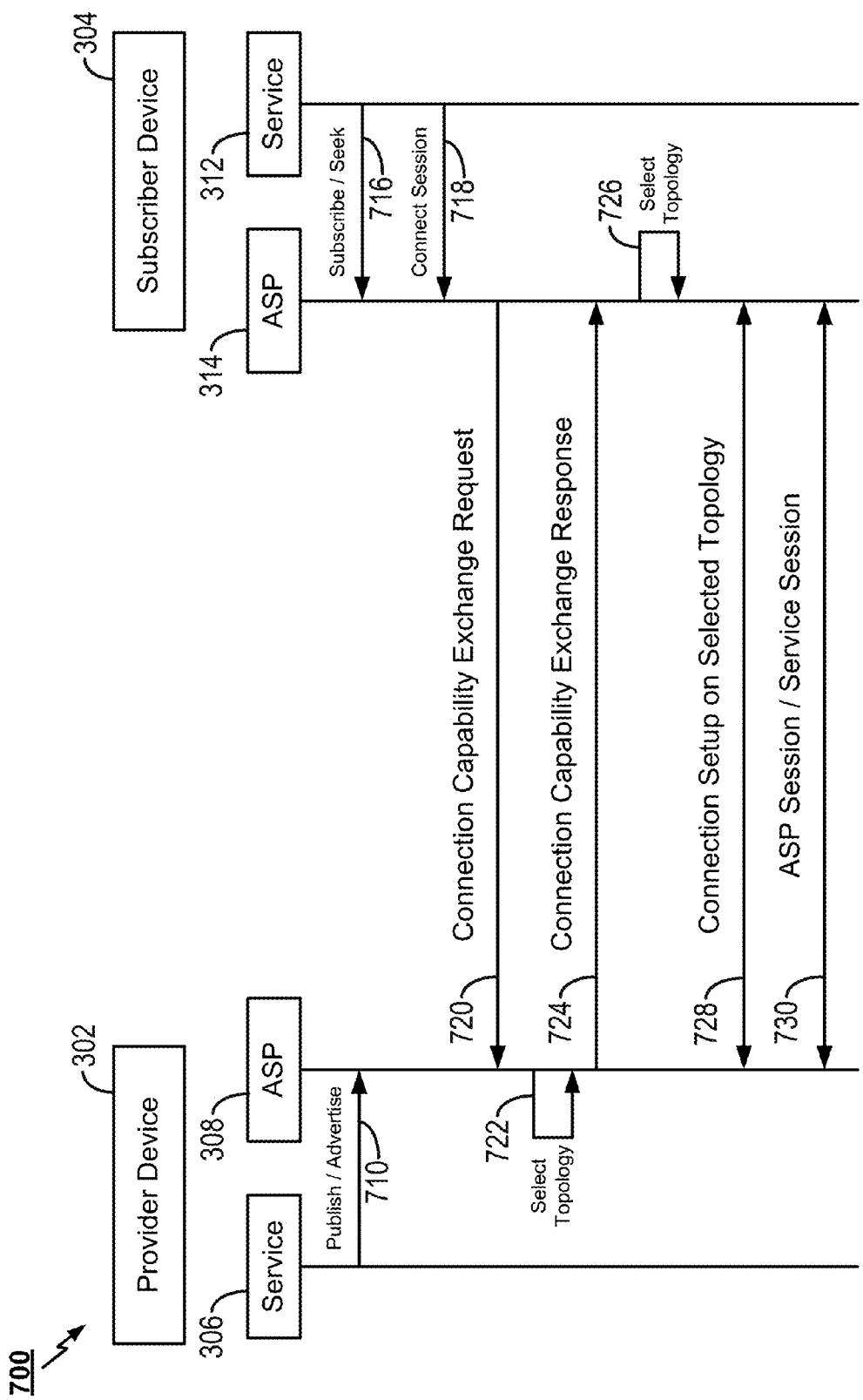
FIG. 7 illustrates another call flow diagram for an exemplary message exchange between a provider device and a subscriber device, according to an embodiment.

FIG. 7 illustrates another call flow diagram for an exemplary message exchange 700 between a provider device 302 and a subscriber device 304, according to an embodiment. Similar to the message exchange 300 of FIG. 3, message exchange 700 may be between the provider device 302 and the subscriber device 304 utilizing the ASPs 308 and 314 to provide and obtain services 306 and 312. As illustrated, the provider device 302 may publish or advertise 710 information about the service 306 utilizing the ASP 308. Similarly, the subscriber device 304 may subscribe or seek 716 the service 312 utilizing the ASP 314. Prior to, or as a part of the message exchange 700, the provider device 302 and the subscriber device 304 may conduct a discovery message exchange, as described herein. Thereafter, the subscriber device 304 may initiate a connection session 718.

As illustrated, the subscriber device 304, through the ASP 314, transmits a connection capability exchange request 720. In some aspects, the connection capability exchange request 720 may be similar to the connection capability exchange message 600 of FIG. 6. If the connection capability exchange request 720 provides information similar to the connection capability exchange message 600, then after receiving the connection capability exchange request 720, the provider device 302 may select a topology 722 for providing the service 306 to the subscriber device 304. Thereafter, the selected topology may be indicated in a connection capability exchange response 724. Upon receiving the selected topology in the connection capability exchange response 724, the subscriber device 304 may initiate a connection setup on the selected topology 728. For example, in one embodiment, the subscriber device 304 may initiate a P2P connection with the provider device 302 by forming or joining a P2P group with the provider device 302. In another embodiment, the subscriber device 304 may initiate a NAN connection with the provider device 302 by forming or joining a NAN data path with the provider device 302. In yet another embodiment, the subscriber device 304 may utilize an existing infrastructure connection with the provider device 302 by utilizing one or more of the infrastructure BSSID or MAC address provided. Thereafter, the provider device 302 and the subscriber device 304 may enter an ASP or service session 730, as described herein. For example, the subscriber device 304 and the provider device 302 may exchange data using the established session by receiving and/or providing data respectively, in order to obtain the requested service.

In another embodiment, the connection capability exchange request 720 may indicate a request for the provider device 302 to provide information about the available connection protocols for providing the service 306. If the connection capability exchange request 720 instead indicates the request for connection capability information, then the provider device 302 may generate a message similar to the connection capability exchange message 600 of FIG. 6, and may transmit the generated message as the connection capability exchange response 724. In some aspects, generating a message may include allocating memory for the message and initializing data values within the allocated memory in accordance with a format of the message. In accordance with this embodiment, upon receiving the connection capability exchange response 724, the subscriber device 304 may select a topology 726 for receiving the service 306 from the provider device 302. Upon selecting the topology, the subscriber device 304 and the provider device 302 may connect and receive/provide data as described above based on the selected topology.

Figure 8:
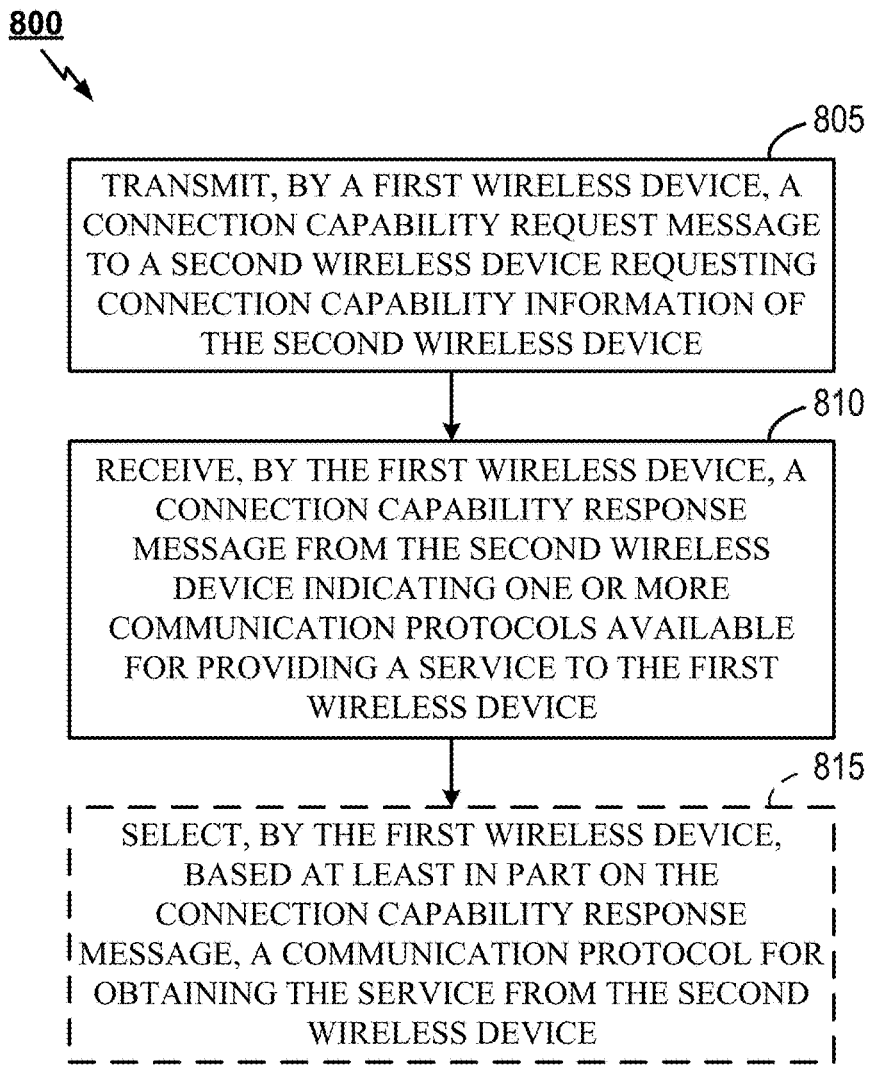
FIG. 8 illustrates an exemplary method of communicating in a wireless communication network, according to an embodiment.

FIG. 8 illustrates an exemplary method 800 of communicating in a wireless communication network, according to an embodiment. Method 800 may contain more or less steps than illustrated, and the steps may be performed in a different order.

At step 805, a first wireless device transmits a connection capability request message to a second wireless device requesting connection capability information of the second wireless device. One or both of the first and second wireless devices may be similar to wireless device 202 of FIG. 2, or one of the STAs 106 or the AP 104 of FIG. 1. In some aspects, the connection capability request message may be transmitted prior to association. In some aspects, the method 800 may further comprise discovering the second wireless device, by the first wireless device, prior to transmitting the connection capability request message, during a service discovery phase. In some aspects, process 800 will execute a first discovery phase according to a first discovery mechanism as part of the service discovery phase. A second discovery phase may be executed according to a second discovery mechanism, wherein the first discovery phase is executed prior to the second discovery phase. In one embodiment, the second discovery mechanism is capable of providing more detailed discovery data than the first discovery mechanism. In one embodiment, the first discovery mechanism comprises a Bluetooth low energy discovery mechanism, and the second discovery mechanism comprises one or more of a peer-to-peer discovery mechanism, a neighbor awareness networking discovery mechanism, a nearfield communication discovery mechanism, and an existing infrastructure protocol.

In some aspects, a device may first utilize a low power consuming discovery mechanism such as Bluetooth LE. The low power consuming discovery mechanism may provide some information regarding the service, but not necessarily all information necessary to utilize the service. For example, some low power consuming discovery mechanisms may discover service information indicating the service requires a data connection in order to obtain data from the service. However, the low power consuming discovery mechanism may not provide the information necessary to actually establish the connection. For example, the lower power consuming discovery mechanism may provide information necessary to initiate a second discovery mechanism, but may not provide information necessary to establish a data connection to obtain data from the service. For example, the lower power consuming discovery mechanism may provide the information shown in FIG. 6 and discussed above. However, the lower power consuming discovery mechanism may not provide one or more of a protocol, destination port or service access point, or Internet Protocol (IP) address, at least one of which may be necessary to establish data communication with the service.

If a service discovered via the lower power consuming discovery mechanism requires a data connection, then a Wi-Fi interface may be engaged to identify the additional information necessary to establish the data connection, such as one or more of a protocol (e.g. UDP or TCP), destination port or service access point, or Internet Protocol (IP) address. The Wi-Fi based discovery may utilize an existing infrastructure network, a peer to peer network, or a neighbor awareness network (NAN) as described above.

At step 810, the first wireless communication device receives a connection capability response message from the second wireless device indicating one or more communication protocols available for providing a service to the first wireless device. In some aspects, the one or more communication protocols comprise one or more of a neighbor awareness networking protocol, a peer-to-peer protocol, and an existing infrastructure protocol. In some aspects, the connection capability response message comprises one or more of an attribute identifier, a length of the connection capability response message, a basic service set identifier of an access point associate with the first wireless device, a medium access control address of the first wireless device, an identifier of a neighbor awareness networking (NAN) cluster that includes the first wireless device, and a NAN interface identifier of the first wireless device. For example, the connection capability response message may include one or more of the informational fields described above with respect to FIG. 6. In various aspects, the first wireless device utilizes an application service platform to transmit the connection capability request message and receive the connection capability response message. For example, the first wireless device may utilize a protocol defined by the WiFi Alliance Application Service Platform 2.0 to perform the second phase of discovery.

Optionally, at step 815 (illustrated by dashed lines), the first wireless device selects, based at least in part on the connection capability response message, a communication protocol for obtaining the service from the second wireless device. In some aspects, the method 800 may further comprise initiating, by the first wireless device, an association procedure with the second wireless device utilizing the selected communication protocol. Associating with the second wireless device may include transmitting an association request to the second wireless device, and receiving an association reply from the second wireless device, the reply indicating a successful association has been performed. In some aspects, the method 800 may further comprise receiving, by the first wireless device, the service from the second wireless device utilizing the selected communication protocol.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations. For instance, in various aspects, means for transmitting may comprise a transmitter and/or an associated processor, such as one or more of the transmitter 210, the transceiver 214, the antenna 216, the DSP 220, the processor 204, the memory 206, or their functional equivalents, as described herein. In some aspects, means for receiving may comprise a receiver and/or associated processor, such as one or more of the receiver 212, the transceiver 214, the antenna 216, the signal detector 218, the DSP 220, the processor 204, the memory 206, or their functional equivalents, as described herein. In some aspects, means for selecting may comprise a processor and/or an associated circuit, such as one or more of the DSP 220, the processor 204, the memory 206, or their functional equivalents, as described herein.

The various illustrative logical blocks, modules and circuits described in connection with the present disclosure can be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise a non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of communicating in a wireless communication network, comprising:
   transmitting, by a first wireless device, a connection capability request message to a second wireless device requesting connection capability information of the second wireless device;
   receiving, by the first wireless device, a connection capability response message from the second wireless device indicating one or more communication protocols available for providing a service to the first wireless device,
   wherein the connection capability request message and the connection capability response message comprise a first discovery protocol;
   selecting, by the first wireless device, based at least in part on the connection capability response message, a communication protocol of the one or more communication protocols for obtaining the service from the second wireless device; and
   performing a second discovery protocol based on the connection capability response message.

2. The method of claim 1, further comprising:
   initiating, by the first wireless device, an association procedure with the second wireless device utilizing the selected communication protocol.

3. The method of claim 1, further comprising:
   receiving, by the first wireless device, the service from the second wireless device utilizing the selected communication protocol.

4. The method of claim 1, wherein the connection capability request message is transmitted prior to association.

5. The method of claim 1, wherein the connection capability response message comprises one or more of an attribute identifier, a length of the connection capability response message, a basic service set identifier of an access point associated with the first wireless device, a medium access control address of the first wireless device, an identifier of a neighbor awareness networking (NAN) cluster that includes the first wireless device, and a NAN interface identifier of the first wireless device.

6. The method of claim 5, further comprising:
   establishing a session for the service based on information obtained from the second discovery protocol; and
   performing data exchange for the service using the established session.

7. The method of claim 6, wherein the information obtained from the second discovery protocol comprises an Internet Protocol address or a destination service access point, and the session is established using the Internet Protocol address or the destination service access point.

8. The method of claim 7, wherein the first discovery protocol comprises a Bluetooth low energy discovery mechanism, and wherein the second discovery protocol comprises one or more of a peer-to-peer discovery mechanism, a neighbor awareness networking discovery mechanism, a nearfield communication discovery mechanism, and an existing infrastructure protocol.

9. The method of claim 8, wherein establishing the session comprises forming or joining a P2P group based on information included in the connection capability response message, initiating a NAN connection by forming or joining a NAN data path based on information included in the connection capability response message, or utilizing a connection to an access point based on a BSSID or MAC address included in the connection capability response message.

10. The method of claim 1, wherein the one or more communication protocols comprise one or more of a neighbor awareness networking protocol, a peer-to-peer protocol, and an existing infrastructure protocol.

11. An apparatus for communicating in a wireless communication network, comprising:
    a transmitter configured to transmit a connection capability request message to a second wireless device requesting connection capability information of the second wireless device; and a receiver configured to receive a connection capability response message from the second wireless device indicating one or more communication protocols available for providing a service to the first wireless device, wherein the connection capability request message and the connection capability response message comprise a first discovery protocol; and a hardware processor configured to:
perform a second discovery protocol based on the connection capability response message; and
select, based at least in part on the connection capability response message, a communication protocol of the one or more communication protocols for obtaining the service from the second wireless device.

12. The apparatus of claim 11, wherein the hardware processor is further configured to initiate an association procedure with the second wireless device utilizing the selected communication protocol.

13. The apparatus of claim 11, wherein the receiver is further configured to receive the service from the second wireless device utilizing the selected communication protocol.

14. The apparatus of claim 11, wherein the connection capability response message comprises one or more of an attribute identifier, a length of the connection capability response message, a basic service set identifier of an access point associate with the first wireless device, a medium access control address of the first wireless device, an identifier of a neighbor awareness networking (NAN) cluster that includes the first wireless device, and a NAN interface identifier of the first wireless device.

15. The apparatus of claim 14, wherein the hardware processor is further configured to:
establish a session for the service based on information obtained from the second discovery protocol; and
perform data exchange for the service using the session.

16. The apparatus of claim 15, wherein the information obtained from the second discovery protocol includes an Internet Protocol address or a destination service access point, and the session is established using the Internet Protocol address or the destination service access point.

17. The apparatus of claim 15, wherein the first discovery protocol comprises a Bluetooth low energy discovery mechanism, and wherein the second discovery protocol comprises one or more of a peer-to-peer discovery mechanism, a neighbor awareness networking discovery mechanism, a nearfield communication discovery mechanism, and an existing infrastructure protocol.

18. The apparatus of claim 11, wherein the one or more communication protocols comprise one or more of a neighbor awareness networking protocol, a peer-to-peer protocol, and an existing infrastructure protocol.

19. An apparatus for communicating in a wireless communication network, comprising:
means for transmitting a connection capability request message to a second wireless device requesting connection capability information of the second wireless device; and
means for receiving a connection capability response message from the second wireless device indicating one or more communication protocols available for providing a service to the first wireless device, wherein the connection capability request message and the connection capability response message comprise a first discovery protocol;
means for selecting, based at least in part on the connection capability response message, a communication protocol of the one or more communication protocols for obtaining the service from the second wireless device; and
means for performing a second discovery protocol based on the connection capability response message.

20. A non-transitory computer readable medium comprising code that, when executed, performs a method of communicating in a wireless communication network, the method comprising:
transmitting, by a first wireless device, a connection capability request message to a second wireless device requesting connection capability information of the second wireless device; and
receiving, by the first wireless device, a connection capability response message from the second wireless device indicating one or more communication protocols available for providing a service to the first wireless device,
wherein the connection capability request message and the connection capability response message comprise a first discovery protocol;
selecting, by the first wireless device, based at least in part on the connection capability response message, a communication protocol of the one or more communication protocols for obtaining the service from the second wireless device; and
performing a second discovery protocol based on the connection capability response message.

21. A method of communicating in a wireless communication network, comprising:
transmitting, by a first wireless device, a discovery message seeking a second wireless device to provide a service;
receiving, by the first wireless device, a discovery response message from the second wireless device providing information about the service;
transmitting, by the first wireless device, based on receiving the discovery response message, a connection capability request message to the second wireless device requesting connection capability information of the second wireless device;
receiving, by the first wireless device, a connection capability response message from the second wireless device,
wherein the connection capability request message and the connection capability response message comprise a first discovery protocol; and
performing a second discovery protocol based on the connection capability response message;
selecting, by the first wireless device, based at least in part on the connection capability response message, a communication protocol for obtaining the service from the second wireless device; and
receiving, by the first wireless device, the service from the second wireless device via the selected communication protocol.

22. A method of communicating in a wireless communication network, comprising:
receiving, by a second wireless device, a connection capability request message from a first wireless device, the connection capability request message requesting connection capability information from the second wireless device;
generating, by the second wireless device, a connection capability response message indicating one or more communication protocols available for providing a service to the first wireless device; and transmitting, by the second wireless device, the connection capability response message to the first wireless device, wherein the connection capability request message and the connection capability response message comprise a first discovery protocol;

receiving, by the second wireless device, a second discovery protocol based on the connection capability response message; and receiving, by the second wireless device, an indication of a communication protocol of the one or more communication protocols selected by the first wireless device.

23. The method of claim 22, further comprising associating with the first wireless device, by the second wireless device, via an association procedure utilizing the selected communication protocol.

24. The method of claim 22, further comprising providing, by the second wireless device, the service to the first wireless device utilizing the selected communication protocol.

* * * * *